Jan. 2, 1951          P. J. KIRCHER          2,536,505
RELIEF PRESSURE VALVE FOR PRESSURE COOKERS
Filed Nov. 22, 1946
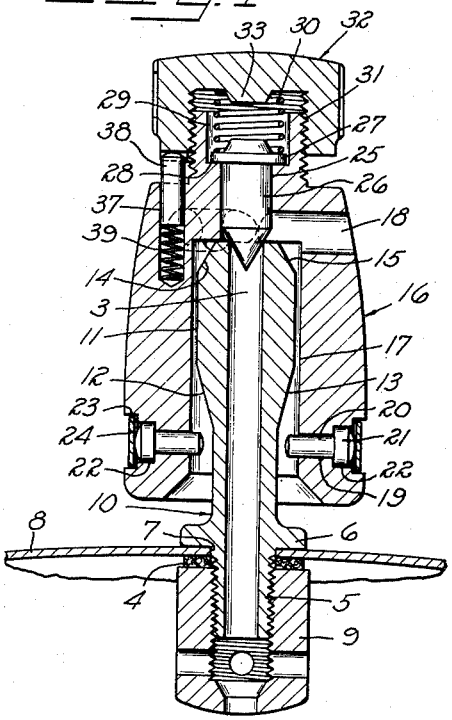
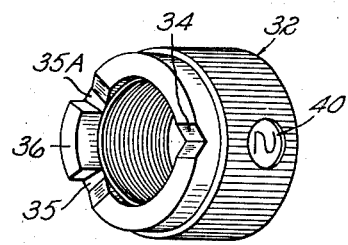
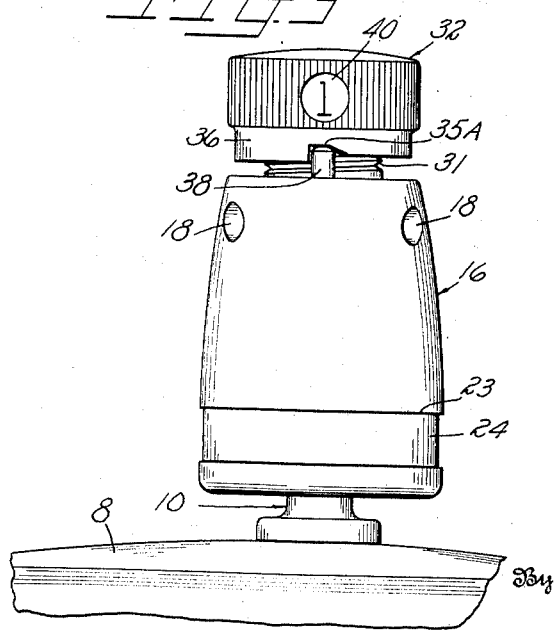
Inventor
PAUL J. KIRCHER
By T. Clay Lindsey
Attorney Patented Jan. 2, 1951

2,536,505

UNITED STATES PATENT OFFICE 2,536,505

RELIEF PRESSURE VALVE FOR PRESSURE COOKERS

Paul J. Kircher, Plainville, Conn., assignor to Landers, Frary & Clark, New Britain, Conn., a corporation of Connecticut Application November 22, 1946, Serial No. 711,627

10 Claims. (Cl. 137—53)

The present invention relates to relief pressure valves for pressure cookers of the type having a weighted valve head adapted to seat on the vent of a vent tube and mounted for relative movement with respect to the vent tube to regulate the steam pressure generated in the pressure cooker. The present invention comprises an improvement over the invention described and claimed in my copending application Serial No. 592,693, filed May 8, 1945 which has now become Patent No. 2,509,101.

It is an aim of the invention to provide a relief pressure valve for pressure cookers having all the advantages of the valve described and claimed in my copending application aforesaid, together with the additional feature of being adjustable to provide a steam pressure release at a plurality of selected pressures.

It is a further aim of the invention to accomplish the foregoing object with a device which may be easily adjusted by the user to provide the desired pressure relief and which is not susceptible to being improperly set through inadvertence.

A further object of the invention is to provide a device which is of relatively simple construction whereby it may be readily assembled at the factory and, in addition, is such that it may be readily adjusted during assembly to provide the desired pressure relief settings without the necessity for forming the parts within close tolerances.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing—

Figure 1 is a central, vertical, cross sectional view of the device shown in position on the cover of a steam pressure cooker;

Fig. 2 is a perspective view of the cap member of the device; and

Fig. 3 is a side view of the device positioned on the cover of a steam pressure cooker.

As described and claimed in my copending application aforesaid, the device comprises a vent tube 10 having adjacent its upper end an annular ridge 11 above and below which the vent tube gradually decreases in diameter so as to provide (in cross section) oppositely disposed sloping sides 12 and 13 below the ridge 11 and sides 14 and 15 above the ridge 11. Surrounding the upper end of the vent tube 10 is a weight 16 having a central bore 17 of sufficiently greater diameter than ridge 11 so that the weight may be easily slid thereover. The weight 16 is vented by means of a plurality of openings 18 extending into the top of the central bore 17. Adjacent the bottom of the weight 16 are two radially extending holes 19 in which are slidably received retaining studs or pins 20 having heads 21 which are received in the counterbores 22. A peripheral groove or channel 23 extends around the outside of the weight 16 on a line with the holes 19, and positioned in this groove 23 is a resilient expansible retaining ring 24 which engages the heads 21 of pins 20 and resiliently urges the pins inwardly so that the ends of the pins extend into the central bore 17.

The lower portion 5 of the vent tube 10 is reduced in diameter, thus providing a shoulder 6, and is adapted to extend through an opening 7 in a cover 8 of a steam pressure cooker with the shoulder 6 resting upon the upper surface of the cover 8. The lower portion 5 of the vent tube 10 is exteriorly threaded to receive a vented lock nut 9 adapted to bear against a gasket 4 resting between the lock nut 9 and the underside of the cover 8 and thus securely fasten the vent tube 10 to the cover.

In accordance with the present invention, the weight 16 is formed with a second vertical bore 25 in which is slidably received a valve head 26 which is adapted to seat in the vent passageway 3, as shown in Fig. 1, and thus close the passageway and prevent steam from escaping therethrough. The upper end of the valve head 26 is provided with an annular flange 27 which is adapted to seat against a shoulder 28 formed at the upper end of the bore 25 by reason of the counterbore 29. Received within the counterbore 29 is a spiral spring 30 which is adapted to urge the valve head 26 downwardly into the position shown in Fig. 1.

The upper end of the weight 16 is of reduced diameter and is threaded at 31 to receive an internally threaded cap member 32. The cap member 32 has a central boss 33 for facilitating the positioning of the spring 30, the cap member 32 being utilized to retain the spring 30 in the operative position shown in the drawing and the compression of the spring 30 being regulated by the distance between the boss 33 and flange 27, which is determined by the extent to which the cap 32 is turned on the threads 31.

The lower edge of the cap member 32 contains a plurality of notches which are shown in the drawing as comprising a V-shaped notch 34 and a pair of notches 35 and 35A disposed on either side of an abutment 36. Disposed in a vertical opening 37 in the weight 16 is a plunger 38 which is urged upwardly by a spring 39. The plunger 38 is adapted to press against the lower edge of the cap member 32 and to enter the notches 34, 35 and 35A when the cap member 32 is turned to align these notches therewith. The engagement of the plunger 38 with either side of the abutment 36, however, limits the turning of the cap member 32 to slightly less than one complete turn.

The object of the above construction is to provide a pressure relief valve which will operate to release the steam pressure of the pressure cooker selectively at a plurality of desired pressures which is determined by the relative position of the cap member 32 on the weight 16. The spring 30 is selected to provide a pressure on the valve head 26 such that, when the cap member 32 is turned to its lowermost position with the plunger 38 engaged in the notch 35, the venting of the pressure cooker can take place only when there is sufficient pressure generated to lift the entire assembly, including the weight 16. When the cap member 32 is turned to the intermediate position with the plunger 38 received in the V-shaped notch 34, the pressure exerted by the spring 30 is of such order that the valve head 26 will be forced upwardly within the bore 25 to vent the pressure cooker before sufficient pressure has been built up to lift the entire weight assembly, including the weight 16. When the cap member 32 is turned to its highest position (as shown in Fig. 3) with the plunger 38 received in the second notch 35A, the pressure exerted on the valve head 26 is a still lesser amount and the pressure in the pressure cooker will be vented at a much smaller value. The notches 34, 35 and 35A are, of course, not essential but they are effective to prevent any turning of the cap member 32 due to vibration or the like and they facilitate the placing of the cap member 32 in predetermined settings. If desired, suitable indicia 40 may be provided adjacent each of the notches 34, 35 and 35A to facilitate the proper setting of the cap member 32. By proper selection of the various weights and springs, the relief pressure valve may be designed to release the pressure of the pressure cooker at such pressures as may be desired. As for example, the device may be constructed so that the entire weight assembly will function when the plunger 38 is in the notch 35 to release the pressure at 15 pounds while, when the cap member is turned to engage the plunger 38 with the notch 34 or 35A, the valve head 26 will operate independently to release the pressure at 10 pounds and 5 pounds respectively. Obviously, any combination of such pressure releases may be provided for as desired.

It is an advantage of the above-described use of the plunger 38 that the operation of the pressure relief valve may be regulated at the factory during the assembly of the device thereby permitting manufacture with much greater tolerances. In assembling the device, the plunger 38 may be pressed downwardly by use of any suitable tools, such as a screw driver, and then the cap member 32 may be freely turned until the proper pressure is exerted by the spring 30. The plunger 38 is then released and thereafter the cap member 32 cannot be turned except between the three notches 34, 35 and 35A.

As in the construction described and claimed in my copending application, the weight 16 is mounted for free movement vertically on the vent tube 10 within limits imposed by the ridge 11 and the pins 20. However, if it is desired to remove the weight 16, it is necessary only to manually exert a sufficient pulling force on the weight 16 or cap member 32 to cause the pins 20 to be cammed outwardly against the resilient ring 24 by the sloping sides 14 and 15, whereupon the weight 16 will be released from the vent tube 10. Essentially, the same action takes place when the weight 16 is replaced, the pins 20 being cammed outwardly during replacement of the weight 16 by the upper sloping sides 14 and 15.

It thus will be seen that, in accordance with the present invention, there has been provided a relief pressure valve for pressure cookers which retains all of the advantages of the device described and claimed in my copending application, but which at the same time has the added advantage of being manually settable to release the pressure at desired alternate pressures which is variable over a wide range. The device is readily assembled at the factory with a minimum of easily manufactured parts and is readily adjustable so as to provide the desired predetermined pressure settings. In the operation of the device, the user may easily select and set the device for the desired release pressure as operation of the setting means is simple and not readily susceptible to inadvertent misuse.

As many changes could be made in the above construction and many apparently widely different embodiments of this invention could be made without department from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a relief pressure valve for pressure cookers, a vent tube having a central vertical vent passage, a weight having a central bore receiving the upper end of said tube and of greater diameter than the maximum diameter of the tube so as to be slidable thereon, a depending valve head slidably mounted in the weight at the upper end of said bore and adapted to seat on the upper end of said vent passage to close same, and adjustable compressible means between said valve head and weight whereby the valve head may be selectively adjusted to unseat from said passage by movement relative to said weight, and means in the weight forming a vent passageway communicating with the upper end of the bore and effective for relief of pressure when the valve head is unseated from said vent passage by movement relative to the weight.

2. In a relief pressure valve for pressure cookers, a vent tube having a central vertical vent passage, a weight having a central bore receiving the upper end of said tube, a depending valve head slidably mounted in the weight for extension into the upper end of said bore and adapted to seat on the upper end of said vent passage, said weight having a passageway for venting said upper end of the bore to atmosphere, adjustable resilient means between said valve head and weight, and means for adjusting said resilient means to provide a seating force which may be selectively greater or lesser than that provided by the weight.

3. In a relief pressure valve for pressure cookers, a vent tube having a central vertical vent passage, a weight having a central bore receiving the upper end of said tube and of greater diameter than the maximum diameter thereof, a depending valve head slidably mounted in the weight for extension into the upper end of said bore and adapted to seat on the upper end of said vent passage, said upper end of the bore being vented to atmosphere, means permitting limited vertical movement of said vented weight whereby the valve head may be unseated to vent the vent tube, and adjustable biasing means for selectively permitting the valve head to unseat independently of movement of the weight at a pressure insufficient to move the weight.

4. In a relief pressure valve for pressure cookers, a vent tube having a central vertical vent passage, a weight having a central bore slidably receiving the upper end of said tube, a depending valve head slidably mounted in the weight for extension into the upper end of said bore and adapted to seat on the upper end of said vent passage, said upper end of the bore being vented to atmosphere, a spring extending between the valve head and the weight, and means for selectively adjusting the force of said spring whereby the valve head may be unseated by relative movement with respect to the weight at a pressure insufficient to move the weight.

5. In a relief pressure valve for pressure cookers, a vent tube having a central vertical vent passage, a weight having a central bore slidably receiving the upper end of said tube, a second bore of smaller cross section than the vent tube extending upwardly from said first bore, and a vent opening communicating with the second bore, a valve head slidably mounted in said second bore and adapted to seat on the upper end of said vent passage, a spring in said second bore biasing said valve head into seating position, and means for varying the biasing force exerted by said spring whereby the valve head may be caused to unseat selectively by movement with or independent of said weight.

6. In a relief pressure valve for pressure cookers, a vent tube having a central vertical vent passage, a weight having a central bore receiving the upper end of said tube, a second bore of smaller cross section than said vent tube communicating with said first bore, and a vent opening communicating with the second bore, a valve head slidably mounted in said second bore and adapted to seat on the top of the vent passage, a spring in said second bore for urging said valve head downwardly on said vent passageway, and a retaining member movably mounted on the weight for adjusting the force of said spring.

7. In a relief pressure valve for pressure cookers, a vent tube having a central vertical vent passage, a weight having a central bore receiving the upper end of said tube, a second bore of smaller cross section than said vent tube extending upwardly from said first bore, and a vent opening communicating with the second bore, a valve head slidably mounted in said second bore and adapted to seat on the top of the vent passage, a spring in said second bore for urging said valve head downwardly into seating position, and a cap threadably secured on said weight for adjustably compressing said spring.

8. In a relief pressure valve for pressure cookers, a vent tube having a central vertical vent passage, a weight having a central bore receiving the upper end of said tube, a second bore of smaller cross section than said vent tube extending upwardly from said first bore, and a vent opening communicating with the second bore, a valve head slidably mounted in said second bore and adapted to seat on the top of the vent passage, a spring in said second bore for urging said valve head downwardly into seating position, a cap threadably secured on said weight for adjustably compressing said spring, and means for limiting movement of said cap.

9. In a relief pressure valve for pressure cookers, a vent tube having a central vertical vent passage, a weight having a central bore receiving the upper end of said tube, a second bore of smaller cross section than said vent tube extending upwardly from said first bore, and a vent opening communicating with the second bore, a valve head slidably mounted in said second bore and adapted to seat on the top of the vent passage, a spring in said second bore for urging said valve head downwardly into seating position, a cap threadably secured on said weight for adjustably compressing said spring, a spring pressed plunger in the weight engaging the lower edge of said cap, and an abutment on the lower edge of said cap cooperating with said plunger to limit turning movement of the cap.

10. In a relief pressure valve for pressure cookers, a vent tube having a central vertical vent passage, a weight having a central bore receiving the upper end of said tube, a second bore of smaller cross section than said vent tube extending upwardly from said first bore, and a vent opening communicating with the second bore, a valve head slidably mounted in said second bore and adapted to seat on the top of the vent passage, a spring in said second bore for urging said valve head downwardly into seating position, a cap threadably secured on said weight for adjustably compressing said spring, a spring pressed plunger in the weight engaging the lower edge of said cap, a plurality of notches in the lower edge of said cap for releasably receiving said plunger, and a plurality of shoulders for engaging said plunger to limit movement of the cap to less than one turn.

PAUL J. KIRCHER.

REFERENCES CITED

The following references are of record in the file of this patent:

UNITED STATES PATENTS

| Number | Name | Date |
|---|---|---|
| 1,515,184 | Waggoner | Nov. 11, 1924 |
| 1,743,350 | Hopkins | Jan. 14, 1930 |
| 2,107,704 | Kronquist | Feb. 8, 1938 |
| 2,200,903 | Stephens | May 14, 1940 |
| 2,462,287 | Richeson | Feb. 22, 1949 |